US012152109B2

(12) United States Patent
de Gans et al.

(10) Patent No.: US 12,152,109 B2
(45) Date of Patent: Nov. 26, 2024

(54) CURABLE CONDENSATION COMPOUNDS BASED ON ALKOXY-FUNCTIONAL POLYSILOXANES

(71) Applicant: Evonik Operations GmbH, Essen (DE)

(72) Inventors: Berend-Jan de Gans, Muelheim an der Ruhr (DE); Philippe Favresse, Ratingen (DE); Wilfried Knott, Essen (DE); Horst Dudzik, Essen (DE); Markus Hallack, Schermbeck (DE); Florian Düllmann, Hagen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/457,944

(22) Filed: Dec. 7, 2021

(65) Prior Publication Data

US 2022/0177652 A1 Jun. 9, 2022

(30) Foreign Application Priority Data

Dec. 9, 2020 (EP) ..................... 20212611

(51) Int. Cl.
*C08G 77/08* (2006.01)
*C08G 77/10* (2006.01)
*C08G 77/18* (2006.01)
*C08K 5/5419* (2006.01)
*C08L 83/06* (2006.01)
*C09D 5/16* (2006.01)

(52) U.S. Cl.
CPC ............. *C08G 77/18* (2013.01); *C08G 77/08* (2013.01); *C08G 77/10* (2013.01); *C08K 5/5419* (2013.01); *C08L 83/06* (2013.01); *C09D 5/16* (2013.01); *C08L 2205/025* (2013.01)

(58) Field of Classification Search
CPC .................................. C08L 83/06; C08G 77/08
See application file for complete search history.

(56) References Cited

U.S. PATENT DOCUMENTS

| 3,032,529 | A  |   | 5/1962  | Clark |
|-----------|----|---|---------|-------|
| 3,440,207 | A  | * | 4/1969  | Wick ........................ C08L 83/06 524/588 |
| 3,639,155 | A  | * | 2/1972  | Hartlein ................. C08G 77/44 428/447 |
| 3,647,917 | A  |   | 3/1972  | Schulz et al. |
| 4,585,705 | A  |   | 4/1986  | Broderick et al. |
| 5,357,024 | A  |   | 10/1994 | Leclaire |
| 5,371,161 | A  |   | 12/1994 | Knott |
| 5,475,127 | A  |   | 12/1995 | Klein et al. |
| 6,291,622 | B1 |   | 9/2001  | Dröse et al. |
| 6,307,082 | B1 |   | 10/2001 | Klein et al. |
| 6,794,445 | B2 |   | 9/2004  | Reusmann et al. |
| 6,858,663 | B2 |   | 2/2005  | Knott et al. |
| 7,018,458 | B2 |   | 3/2006  | Knott et al. |
| 7,196,153 | B2 |   | 3/2007  | Burkhart et al. |
| 7,598,334 | B2 |   | 10/2009 | Ferenz et al. |
| 7,612,158 | B2 |   | 11/2009 | Burkhart et al. |
| 7,612,159 | B2 |   | 11/2009 | Burkhart et al. |
| 7,619,035 | B2 |   | 11/2009 | Henning et al. |
| 7,645,848 | B2 |   | 1/2010  | Knott et al. |
| 7,754,778 | B2 |   | 7/2010  | Knott et al. |
| 7,825,205 | B2 |   | 11/2010 | Knott et al. |
| 7,825,206 | B2 |   | 11/2010 | Neumann et al. |
| 7,825,209 | B2 |   | 11/2010 | Knott et al. |
| 7,838,603 | B2 |   | 11/2010 | Schwab et al. |
| 7,989,030 | B2 |   | 8/2011  | Boisvert et al. |
| 8,158,572 | B2 |   | 4/2012  | Schubert et al. |
| 8,268,939 | B2 |   | 9/2012  | Ebbrecht et al. |
| 8,283,422 | B2 |   | 10/2012 | Schubert et al. |
| 8,309,664 | B2 |   | 11/2012 | Knott et al. |
| 8,324,325 | B2 |   | 12/2012 | Knott et al. |
| 8,450,514 | B2 |   | 5/2013  | Schubert et al. |
| 8,557,944 | B2 |   | 10/2013 | Henning et al. |
| 8,598,295 | B2 |   | 12/2013 | Henning et al. |
| 8,609,798 | B2 |   | 12/2013 | Knott et al. |
| 8,623,984 | B2 |   | 1/2014  | Henning et al. |
| 8,722,834 | B2 |   | 5/2014  | Knott et al. |
| 8,729,207 | B2 |   | 5/2014  | Hartung et al. |
| 8,779,079 | B2 |   | 7/2014  | Henning et al. |
| 8,802,744 | B2 |   | 8/2014  | Knott et al. |
| 8,946,369 | B2 |   | 2/2015  | Henning et al. |
| 8,957,009 | B2 |   | 2/2015  | Schubert et al. |
| 8,969,502 | B2 |   | 3/2015  | Knott et al. |
| 9,006,356 | B2 | * | 4/2015  | Horstman ............... C08J 3/203 525/477 |

(Continued)

FOREIGN PATENT DOCUMENTS

DE 21 16 816 10/1971
DE 34 12 648 6/1987

(Continued)

OTHER PUBLICATIONS

Extended European Search Report issued Jun. 7, 2021, in European Application No. 20212611.6, 6 pages.
Jaumann et al., "Hyperbranched Polyalkoxysiloxanes via $AB_3$—Type Monomers", Macromolecular Chemistry and Physics, vol. 204, 2003, pp. 1014-1026.
Manfred Jaumann, "Hyperbranched Polyalkoxysiloxanes Synthesis, Characterization and Applications", Sep. 4, 2008, 269 pages.
Mark et al., "Encyclopedia of polymer science & technology, concise", pp. 1112-1116.
Ratner et al., "Biomaterials Science", An introduction to Materials in Medicine, $2^{nd}$ Edition, pp. 83-84.
Robeyns et al., "Synthesis, characterization and modification of silicone resins: An "Augmented Review"", Progress in Organic Coatings, vol. 125, 2018, pp. 287-3158
U.S. Appl. No. 16/949,320, filed Oct. 26, 2020, 2021/0122921, Hallack et al.

(Continued)

*Primary Examiner* — Margaret G Moore

(74) *Attorney, Agent, or Firm* — Grüneberg and Myers PLLC

(57) ABSTRACT

Curable condensation compounds are useful, obtainable by the reaction of end-equilibrated acetoxy group-bearing siloxanes with at least one alkoxy-functional polysiloxane, in the presence of a catalyst.

26 Claims, No Drawings

(56) References Cited

U.S. PATENT DOCUMENTS

| | | |
|---|---|---|
| 9,068,044 B2 | 6/2015 | Schubert et al. |
| 9,138,385 B2 | 9/2015 | Dahl et al. |
| 9,266,825 B2 | 2/2016 | Lomoelder et al. |
| 9,353,289 B2 | 5/2016 | De Gans et al. |
| 9,481,695 B2 | 11/2016 | Knott et al. |
| 9,540,500 B2 | 1/2017 | Ferenz et al. |
| 9,695,202 B2 | 7/2017 | Henning et al. |
| 9,796,876 B2 | 10/2017 | Lomoelder et al. |
| 9,975,909 B2 | 5/2018 | Schubert et al. |
| 10,010,838 B2 | 7/2018 | Favresse et al. |
| 10,399,998 B2 | 9/2019 | Knott et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,752,735 B2 | 8/2020 | Knott et al. |
| 10,766,913 B2 | 9/2020 | Knott et al. |
| 10,954,344 B2 | 3/2021 | Knott et al. |
| 11,021,575 B2 | 6/2021 | Knott et al. |
| 11,066,429 B2 | 7/2021 | Knott et al. |
| 11,220,578 B2 | 1/2022 | Knott et al. |
| 11,236,204 B2 | 2/2022 | Favresse et al. |
| 11,254,819 B2 | 2/2022 | Hallack et al. |
| 11,261,298 B2 | 3/2022 | Favresse et al. |
| 11,279,804 B2 | 3/2022 | Knott et al. |
| 11,286,351 B2 | 3/2022 | Knott et al. |
| 11,286,366 B2 | 3/2022 | Knott et al. |
| 11,345,783 B2 | 5/2022 | Knott et al. |
| 11,359,056 B2 | 6/2022 | Knott et al. |
| 11,377,523 B2 | 7/2022 | Favresse et al. |
| 11,420,985 B2 | 8/2022 | Knott et al. |
| 11,472,822 B2 | 10/2022 | Knott et al. |
| 11,498,996 B2 | 11/2022 | Knott et al. |
| 2002/0161158 A1 | 10/2002 | Burkhart et al. |
| 2003/0198819 A1 | 10/2003 | Reusmann et al. |
| 2004/0132951 A1 | 7/2004 | Burkhart et al. |
| 2004/0147703 A1 | 7/2004 | Burkhart et al. |
| 2004/0229964 A1 | 11/2004 | Knott et al. |
| 2005/0257717 A1 | 11/2005 | Knott et al. |
| 2006/0155089 A1 | 7/2006 | Ferenz et al. |
| 2006/0241270 A1 | 10/2006 | Burkhart et al. |
| 2007/0043193 A1 | 2/2007 | Henning et al. |
| 2007/0049717 A1 | 3/2007 | Knott et al. |
| 2008/0153934 A1 | 6/2008 | Neumann et al. |
| 2008/0153992 A1 | 6/2008 | Knott et al. |
| 2008/0153995 A1 | 6/2008 | Knott et al. |
| 2008/0221276 A1 | 9/2008 | Schwab et al. |
| 2009/0030097 A1 | 1/2009 | Knott et al. |
| 2009/0137751 A1 | 5/2009 | Knott et al. |
| 2009/0137752 A1 | 5/2009 | Knott et al. |
| 2010/0022435 A1 | 1/2010 | Henning et al. |
| 2010/0041910 A1 | 2/2010 | Schubert et al. |
| 2010/0105843 A1 | 4/2010 | Knott et al. |
| 2010/0184913 A1 | 7/2010 | Ebbrecht et al. |
| 2010/0249339 A1 | 9/2010 | Henning et al. |
| 2010/0292357 A1 | 11/2010 | Knott et al. |
| 2010/0298455 A1 | 11/2010 | Henning et al. |
| 2011/0021693 A1 | 1/2011 | Henning et al. |
| 2011/0172373 A1 | 7/2011 | Knott et al. |
| 2011/0190190 A1 | 8/2011 | Schubert et al. |
| 2011/0245412 A1 | 10/2011 | Schubert et al. |
| 2011/0301254 A1 | 12/2011 | Knott et al. |
| 2012/0010302 A1 | 1/2012 | Hartung et al. |
| 2012/0037036 A1 | 2/2012 | Veit et al. |
| 2012/0097883 A1 | 4/2012 | Henning et al. |
| 2012/0282210 A1 | 11/2012 | Henning et al. |
| 2012/0296125 A1 | 11/2012 | Schubert et al. |
| 2012/0308494 A1 | 12/2012 | Schubert et al. |
| 2013/0035408 A1 | 2/2013 | Knott et al. |
| 2013/0041115 A1 | 2/2013 | Knott et al. |
| 2013/0217907 A1 | 8/2013 | Henning et al. |
| 2013/0245304 A1 | 9/2013 | Schubert et al. |
| 2014/0094532 A1 | 4/2014 | Knott et al. |
| 2014/0134125 A1 | 5/2014 | Dahl et al. |
| 2014/0256844 A1 | 9/2014 | Henning et al. |
| 2014/0309446 A1 | 10/2014 | Amajjahe et al. |
| 2015/0023900 A1 | 1/2015 | Knott et al. |
| 2015/0073069 A1 | 3/2015 | De Gans et al. |
| 2015/0080593 A1 | 3/2015 | Henning et al. |
| 2015/0191625 A1 | 7/2015 | Lomoelder et al. |
| 2015/0225337 A1 | 8/2015 | Lomoelder et al. |
| 2016/0075918 A1 | 3/2016 | Bögershausen et al. |
| 2016/0160009 A1 | 6/2016 | Ferenz et al. |
| 2016/0208151 A1* | 7/2016 | Friedel .................... C08L 83/04 |
| 2018/0016392 A1 | 1/2018 | Lobert et al. |
| 2018/0028994 A1 | 2/2018 | Favresse et al. |
| 2018/0134850 A1 | 5/2018 | Knott et al. |
| 2018/0305596 A1 | 10/2018 | Schubert et al. |
| 2018/0319823 A1 | 11/2018 | Knott et al. |
| 2018/0355114 A1 | 12/2018 | Knott et al. |
| 2018/0355115 A1 | 12/2018 | Knott et al. |
| 2019/0040205 A1 | 2/2019 | Knott et al. |
| 2019/0100625 A1 | 4/2019 | Knott et al. |
| 2019/0106369 A1 | 4/2019 | Schubert et al. |
| 2019/0106441 A1 | 4/2019 | Knott et al. |
| 2020/0055991 A1 | 2/2020 | Knott et al. |
| 2020/0055992 A1 | 2/2020 | Knott et al. |
| 2020/0308406 A1 | 10/2020 | Seyfried et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377526 A1 | 12/2020 | Knott et al. |
| 2020/0377640 A1 | 12/2020 | Knott et al. |
| 2020/0377660 A1 | 12/2020 | Knott et al. |
| 2020/0377663 A1 | 12/2020 | Favresse et al. |
| 2020/0377665 A1 | 12/2020 | Knott et al. |
| 2020/0377666 A1 | 12/2020 | Knott et al. |
| 2020/0377667 A1 | 12/2020 | Favresse et al. |
| 2020/0377668 A1 | 12/2020 | Favresse et al. |
| 2020/0377669 A1 | 12/2020 | Knott et al. |
| 2020/0377686 A1 | 12/2020 | Knott et al. |
| 2021/0122921 A1 | 4/2021 | Hallack et al. |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0206972 A1 | 7/2021 | Schulz et al. |
| 2021/0253799 A1 | 8/2021 | Knott et al. |
| 2021/0301099 A1 | 9/2021 | Knott et al. |
| 2021/0371598 A1 | 12/2021 | Knott et al. |
| 2022/0033587 A1 | 2/2022 | Knott et al. |
| 2022/0047969 A1 | 2/2022 | Schierle et al. |
| 2022/0073765 A1 | 3/2022 | Hinrichs et al. |
| 2022/0119617 A1 | 4/2022 | Knott et al. |
| 2022/0348721 A1 | 11/2022 | Knott et al. |
| 2022/0363838 A1 | 11/2022 | Henning et al. |

FOREIGN PATENT DOCUMENTS

| | | |
|---|---|---|
| DE | 20 2010 017915 U1 | 3/2013 |
| EP | 1 013 701 | 6/2000 |
| EP | 1 350 804 | 10/2003 |
| EP | 4 083 110 | 11/2022 |
| WO | 2014/187972 | 11/2014 |
| WO | 2021/058263 | 4/2021 |

OTHER PUBLICATIONS

U.S. Appl. No. 10/083,763, filed Feb. 25, 2002, 2002/0161158, Burkhart et al.
U.S. Appl. No. 12/571,493, filed Oct. 1, 2009, 2010/0022435, Henning et al.
U.S. Appl. No. 12/277,852, filed Nov. 25, 2008, 2009/0137752, Knott et al.
U.S. Appl. No. 13/650,221, filed Oct. 12, 2012, 2013/004115, Knott et al.
U.S. Appl. No. 14/282,608, filed May 20, 2014, 2014/0256844, Henning et al.
U.S. Appl. No. 13/521,351, filed Jul. 10, 2012, 2012/0282210, Henning et al.
U.S. Appl. No. 13/153,622, filed Jun. 6, 2011, 2011/0301254, Knott et al.
U.S. Appl. No. 13/205,834, filed Aug. 9, 2011, 2012/0037036, Veit et al.

(56) References Cited

OTHER PUBLICATIONS

U.S. Appl. No. 14/355,239, filed Apr. 30, 2014, 2014/0309446, Amajjahe et al.
U.S. Appl. No. 15/540,605, filed Jun. 29, 2017, 2018/0016392, Lobert et al.
U.S. Appl. No. 15/767,894, filed Apr. 12, 2018, 2018/0305596, Schubert et al.
U.S. Appl. No. 16/087,762, filed Sep. 24, 2018, 2019/0106369, Schubert et al.
U.S. Appl. No. 16/759,413, filed Apr. 27, 2020, 2020/0339612, Knott et al.
U.S. Appl. No. 17/147,592, filed Jan. 13, 2021, 2021/0130551, Knott et al.
U.S. Appl. No. 17/414,497, filed Jun. 16, 2021, 2022/0073765, Hinrichs et al.
U.S. Appl. No. 17/297,372, filed May 26, 2021, 2022/0033587, Knott et al.
U.S. Appl. No. 16/834,781, filed Mar. 30, 2020, 2020/0308406, Seyfried et al.
U.S. Appl. No. 17/126,172, filed Dec. 18, 2020, 2021/0206972, Schulz et al.
U.S. Appl. No. 16/851,385, filed Apr. 17, 2020, 2020/0377666, Knott et al.
U.S. Appl. No. 17/177,489, filed Feb. 17, 2021, 2021/0301099, Knott et al.
U.S. Appl. No. 17/145,558, filed Jan. 11, 2021, 2021/0253799, Knott et al.
U.S. Appl. No. 17/239,011, filed Apr. 23, 2021, 2021/0371598, Knott et al.
U.S. Appl. No. 17/399,276, filed Aug. 11, 2021, 2022/0047969, Schierle et al.
U.S. Appl. No. 17/476,417, filed Sep. 15, 2021, 2022/0119617, Knott et al.

\* cited by examiner

CURABLE CONDENSATION COMPOUNDS BASED ON ALKOXY-FUNCTIONAL POLYSILOXANES

CROSS-REFERENCE TO RELATED APPLICATIONS

This application claims priority to European Patent Application No. 20212611.6, filed on Dec. 9, 2020, the content of which is hereby incorporated by reference in its entirety.

BACKGROUND OF THE INVENTION

Field of the Invention

The invention relates to curable condensation compounds based on alkoxy-functional polysiloxanes, to preparation processes therefor and to the use thereof in coating systems having a propensity to repel soil among other properties.

Description of Related Art

Coatings are applied to surfaces for decorative, functional or protective purposes. The demand for surface protection is continually increasing in different industry sectors, such as aerospace, automotive, rail vehicle, shipbuilding and wind energy.

Various technologies are employed in the functionalization of surfaces and coatings. The approach to surface functionalization by micro- and nanostructuring of coatings derived from the scale structure of sharks is known from the literature. Such surfaces are employed in component parts of ships, aeroplanes, rotor blades of wind energy plants or pipelines to reduce flow resistance. Self-healing coatings have also been developed where, in the event of mechanical damage to the system, encapsulated functional active ingredients are released and then display their healing activity. These self-healing surfaces are of interest for corrosion protection.

A further known problem is the defilement caused by vandalism, for example graffiti on walls or objects. This problem affects not only local authorities, but particularly also transport companies. This is because the cleaning of such surfaces is very inconvenient and costly.

Great efforts have been made in the development of cleaning techniques for removal of graffiti. A customary technique is the removal of the surface with a paint remover, for instance methylene chloride, benzene or toluene. According to the substrate, temperature and colourant and the particular exposure time, the colourant is removed by means of a high-pressure cleaner for example. This process can/must be repeated several times. Any graffiti residues can then be removed by sandblasting, which can require reworking of the surface in order to re-establish its former appearance. Another technique is costly and inconvenient repainting or recoating of the surface, which likewise takes a long time and can incur considerable costs.

Also known are anti-fouling coatings/foul-release coatings which prevent or at least markedly impede algal and bivalve overgrowth of surfaces in constant contact with water. Particularly in the case of structures subject to permanent contact with water, for example in the case of ships' hulls, buoys, fishing nets, draw and drain pipes for cooling, offshore drilling installations or water tanks that are exposed to seawater and/or freshwater, the adhesion and overgrowth of organisms (bio-fouling) causes considerable economic losses. In the case of ships, these result, for example, from the increase in friction and the associated increase in fuel consumption. In the case of static structures, surfaces are also subject to mechanical damage as a result of the increase in resistance to waves or flows, which leads to shorter maintenance cycles and hence also to reduced service life.

Foul-release coatings are often based on polysiloxanes or silicone elastomers, the mechanism of action of which is the formation of an anti-adhesion surface to which aquatic organisms cannot adhere or on which the adhesive forces are so low that they are detached by the movement in the water.

It is therefore known to add polysiloxanes to coatings to achieve particular properties. Through the chemical modification of the polydimethylsiloxane chain, for example, it was possible to control the most important silicone properties, for instance compatibility, slip resistance or scratch resistance. The use of polysiloxanes is widespread and very complex.

Since the early days of the silicone industry, condensation-crosslinkable hydroxy- and/or especially alkoxy-terminated, but also acetoxy-functional, polydiorganosiloxanes have been of major significance as typical representatives of silicone resin precursors. For instance, the teaching of EP 0 157 318 B1 is aimed at a process for preparing silicone resin precursors of the general formula $R^2{}_a Si(OR^1)_b O_{(4-a-b)/2}$, which are obtained by alcoholysis/hydrolysis and partial condensation of organochlorosilanes with alcohol/water.

CN105131293 B addresses acetoxy-functionalized MQ resins and the preparation thereof. In a hydrolysis medium consisting of dilute hydrochloric acid and ethanol, hexamethyldisiloxane and tetraethoxysilane are accordingly first converted to an ethoxy-functional silicone resin prepolymer, and this is modified in a second step by reaction with an organoacetoxysilane to give a self-crosslinking acetoxy MQ resin.

A similar direction is taken by the teaching of Clarke (U.S. Pat. No. 3,032,529), who describes stabilized organopolysiloxane resins. With the aim of preparing storage-stable silicone coating systems for wood, plastic, metal and ceramic surfaces that cure within 24 hours at room temperature, the document teaches the acylation of pure and/or mixed, incompletely condensed ≡Si—OH— terminated diorganosiloxanes with acylating agents, preferably with triacyloxysilanes, in order to remove all Si-bonded hydroxyl groups.

Without emphasizing the utilization of acetoxysiloxanes, U.S. Pat. No. 4,585,705 (Broderick et al.) concerns organopolysiloxane-based release coatings that are curable on the substrate, which include hydroxy-functional methyl, phenyl and mixed methyl/phenyl resins alongside a methyltrimethoxysilane (derivative), and also small proportions of trimethylsilyl end-blocked diorganosiloxanes and titanate esters.

Likewise known is the linkage of terminally hydroxy-functional siloxanes (PDM siloxanes) to a multifunctional acetoxysilane as crosslinker to give hydrolytically unstable siloxane prepolymers provided with acetoxy groups (H. F. Mark, Concise Encyclopedia of Polymer Science and Technology, 3rd edition, page 1112, Wiley-Verlag, (2013) and also in A. S. Hoffman et al., Biomaterials Science: An Introduction to Material in Medicine, 2nd Edition, pages 83-84, Elsevier Acad. Press, San Diego, (2004)).

With US 2009/0226609, Boisvert et al. claim Q-titanium-based silicone resins that are prepared by reacting a system consisting of di(t-butoxy)diacetoxysilane, tetrahydrofuran, water and tetra(t-butoxy)titanium.

According to C. Robeyns et al. (Progress in Organic Coatings 125, p. 287-315, (2018), what takes place here is firstly hydrolysis of the di(t-butoxy)diacetoxysilane to form ortho-silica Si(OH)$_4$, which then condenses with tetra(t-butoxy)titanium, releasing 4 equivalents of t-butanol, to give the mixed titanium-silicone resin.

However, the use of titanates is problematic with regard to their tendency to break down in the presence of water, since this leads to formation and precipitation of insoluble tetravalent titanium hydroxide that causes haze specifically in coating systems. This is especially true of those systems in which hydrolysis is conducted in the presence of titanates. To overcome this problem, specifically in the production of anti-abrasive coating systems for transparent polycarbonate, Leclaire (U.S. Pat. No. 5,357,024) proposes dilute reaction of an alkoxysilane hydrolysate having condensable ≡SiOH groups with an acyltitanate compound and with subsequent addition of water, such that this results in a siloxane pre-polymer having titanium bound therein within the range from 20% to 30% by weight of TiO$_2$ based on solids. Leclaire obtains the acyltitanate compounds by reacting tetraalkyl titanates or tetraalkoxytitanium compounds with carboxylic acids in nonaqueous solvents, for example in alcohols.

When these hydrolysable titanium compounds are used, Leclaire does not observe the formation of precipitates in the coating matrices, even when the hydrolysis of the silanes is effected under harsh conditions. Leclaire interprets this observation with the assumption that the acyloxy group(s) bound within the titanium compound reduce(s) reactivity of the titanium compound.

U.S. Pat. No. 5,357,024 goes on to teach that these acyltitanates are obtained proceeding from tetraalkyl titanates in which the alkoxy functions are substituted by acyloxy functions. The preparation is effected in the absence of water by reaction of a tetraalkoxytitanium or a tetraalkyl titanate of the formula Ti(OR')$_4$ in which the R' radicals may be the same or different with a carboxylic acid RCOOH, wherein the amount of the acid used for this reaction is chosen according to the number of alkoxy functions for which substitution is desired, in amounts of 1 to 4 equivalents of acid to 1 equivalent of tetraalkoxytitanium. The reaction is preferably effected in the presence of a suitable nonaqueous solvent, for example an alcohol such as isopropanol.

With the aim of obtaining a silane AB$_3$-type precursor for formation of hyperbranched polyethoxysiloxanes, Jaumann et al. in Macromol. Chem. Phys. 2003, 204, 1014-1026 describe the reaction of tetraethoxysilane with acetic anhydride that takes place at 137° C. and over a period of at least 36 hours (and even requires 89 hours in the thesis by M. Jaumann, Apr. 9, 2008, RWTH Aachen, p. 47), which releases ethyl acetate to form acetoxytriethoxysilane in yields of only about 39% as ABs-type precursor. In an attempt to improve the unsatisfactory reaction kinetics, Jaumann also uses tetraethyl orthotitanate as catalyst in low and high dosage. With 0.155 mol % of added tetraethyl orthotitanate, the time required for the reaction that then proceeds with about 94% conversion is reduced to 14.5 hours. 0.95 mol % of added tetraethyl orthotitanate, with about 88% conversion, reduces the reaction time to 1.5 hours, but with severe loss of product purity. In the polyethoxysiloxane obtained therefrom, about 6 mol % of all silicon atoms comes from the tetraethoxysilane used (thesis by M. Jaumann, Apr. 9, 2008, RWTH Aachen, p. 47-50).

Likewise reflecting Jaumann's work, WO 2014/187972 claims the use of fluorine-free, highly branched polyalkoxysiloxanes for production of soil-repellent surface coatings having a level of branching of VG>0.4 according to a complicated calculation formula involving $^{29}$Si NMR spec-troscopy. The highly branched polyalkoxysiloxane is prepared with tetraethoxysilane, acetic anhydride and tetrakis (trimethylsiloxy)titanium or with Dynasylan® 40, acetic anhydride and titanium(IV) isopropoxide or with Dynasylan® 40, acetic anhydride and α-n-butyl-ω-(trimethoxysilyl) ethylpolydimethylsiloxane.

Without emphasis on polyalkoxysiloxanes, the aim of the teaching of WO 2019/200579 is a polysiloxane composition for production of a room temperature crosslinking, noncorrosive elastomer containing a hydroxyl-terminated polyorganosiloxane, a diacetoxysilane, a multifunctional alkoxysilane, and a filler and a catalyst.

WO 2012/040305 discloses a curable composition comprising organosiloxane block copolymers having a weight-average molecular weight M$_w$, over 20 000 g/mol, wherein these are generated by the reaction of silanol group-bearing organosiloxane resins (component b) with linear geminal diacetoxy-substituted organosiloxanes (component a). What is meant here by "geminal diacetoxy-substituted" is that the organosiloxane has two adjacent acetoxy groups [—Si—(OAc)$_2$] in a terminal position on a silicon atom. These geminal diacetoxy-substituted organosiloxanes are prepared by reaction of silanol-terminated polydiorganosiloxanes with alkyltriacetoxysilanes. This process thus leads to multiple crosslinks about the centre of the acetoxysilane used. In this process, the acetic acid formed has to be removed from the system. The removal of the acetic acid released is difficult since it forms hydrogen bonds that hinder thermal separation thereof. Assurance of freedom from acid (and freedom from water) in the linear organosiloxane block copolymer is essential since it is otherwise unusable on acid-sensitive substrates. Preparation also requires a solvent since the reactants or silsesquioxanes used are solid.

SUMMARY OF THE INVENTION

It is therefore an object of the present invention to provide compounds suitable for production of coating systems, where these have improved anti-adhesive effect without significant impairment of the other properties and without having the disadvantages mentioned in the prior art.

In order to achieve the object, condensation compounds of the type specified at the outset are proposed, which are obtainable by the reaction of end-equilibrated acetoxy group-bearing siloxanes of formula (I) and/or formula (II):

Formula (I)

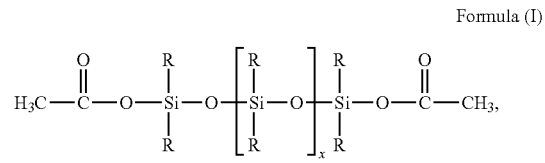

where R=an alkyl radical having 1 to 4 carbon atoms and/or phenyl radical, preferably R=methyl radical, and 1≤x≤500, preferably 3≤x≤100, more preferably 5≤x≤40, or

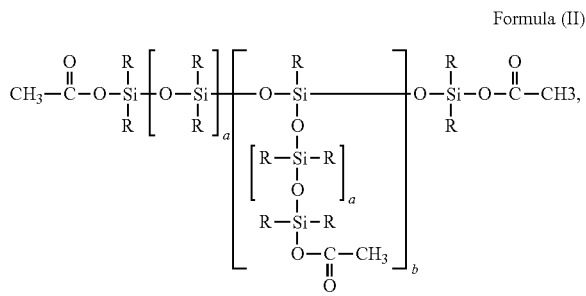
Formula (II)

where $0 \leq a \leq 100$ and $1 \leq b \leq 10$, preferably with $2 \leq a \leq 30$ and $1 \leq b \leq 6$, more preferably with $3 \leq a \leq 10$ and $2 \leq b \leq 5$, with at least one alkoxy-functional polysiloxane of the formula (III)

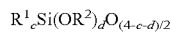 Formula(III)

in which c is not less than 0 to not more than 2 and d is not less than 0 to not more than 4, and the sum total of c+d is less than 4, $R^1$ is the same or different and is independently linear or branched, saturated or else mono- or polyunsaturated or aromatic hydrocarbon radicals, and $R^2$ is an alkyl group consisting of 1 to 8 carbon atoms, preferably a methyl or ethyl group, in the presence of a catalyst.

The invention also includes the following embodiments:

1. Curable condensation compounds, obtainable by the reaction of
   end-equilibrated acetoxy group-bearing siloxanes of formula (I) and/or formula (II):

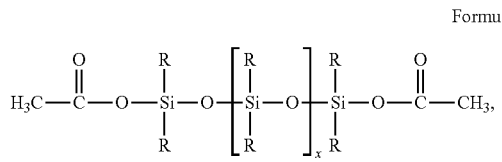
Formula (I)

where R=an alkyl radical having 1 to 4 carbon atoms and/or phenyl radical, preferably R=methyl radical, and $1 \leq x \leq 500$, preferably $3 \leq x \leq 100$, more preferably $5 \leq x \leq 40$, or

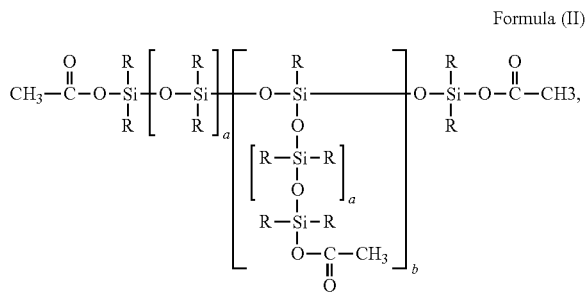
Formula (II)

where $0 \leq a \leq 100$ and $1 \leq b \leq 10$, preferably with $2 \leq a \leq 30$ and $1 \leq b \leq 6$, more preferably with $3 \leq a \leq 10$ and $2 \leq b \leq 5$, with at least one alkoxy-functional polysiloxane of the formula (III)

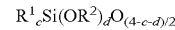 Formula (III)

in which c is not less than 0 to not more than 2 and d is not less than 0 to not more than 4, and the sum total of c+d is less than 4, $R^1$ is the same or different and is independently linear or branched, saturated or else mono- or polyunsaturated or aromatic hydrocarbon radicals, and $R^2$ is an alkyl group consisting of 1 to 8 carbon atoms, preferably a methyl or ethyl group, in the presence of a catalyst.

2. Condensation compounds according to embodiment 1, characterized in that the reaction includes at least one crosslinker of formula (IV)

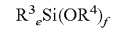 Formula (IV)

in which e is not less than 0 to not more than 2, f is not less than 2 to not more than 4, and the sum total of e+f is 4, $R^3$=a saturated or unsaturated alkyl group consisting of 1 to 8 carbon atoms or an aromatic moiety having 6 to 20 carbon atoms and $R^4$=an alkyl or acyl group consisting of 1 to 8 carbon atoms.

3. Condensation compounds according to either of the preceding embodiments, characterized in that end-equilibrated acetoxy group-bearing siloxanes of formula (I) or formula (II) have been neutralized.

4. Condensation compounds according to any of the preceding embodiments, characterized in that acetoxy group-bearing siloxanes of formula (I) have exclusively D units.

5. Condensation compounds according to any of the preceding embodiments, characterized in that α,ω-acetoxy group-bearing linear polydimethylsiloxanes are used for the reaction.

6. Condensation compounds according to any of the preceding embodiments, characterized in that the alkoxy-functional polysiloxane has $R^1$ radicals=methyl and/or phenyl radicals.

7. Condensation compounds according to any of the preceding embodiments, characterized in that the weight-average molecular weight of the alkoxy-functional polysiloxanes is 200 to 20 000 g/mol, preferably 200 to 10 000 g/mol, more preferably 300 to 3000 g/mol and even further preferably 400 to 2000 g/mol.

8. Condensation compounds according to any of the preceding embodiments, characterized in that the alkoxy functionality of the alkoxy-functional polysiloxanes is from 50% to 3% by weight, preferably 40% to 5% by weight and more preferably 30% to 7% by weight, based on the total mass of the resin component.

9. Condensation compounds according to any of the preceding embodiments, characterized in that the catalyst is selected from tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, trisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl) zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates, bismuth triflate.

10. Condensation compounds according to any of the preceding embodiments, characterized in that the crosslinker is selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane and diethoxyphenylmethylsilane.

11. Process for preparing the condensation compounds according to any of embodiments 1-10, characterized in that end-equilibrated acetoxy group-bearing siloxanes of formula (I) and/or formula (II) are reacted with at least one alkoxy-functional polysiloxane of the formula (III) in the presence of a catalyst.

12. Process according to embodiment 11, characterized in that the weight ratio of acetoxy group-bearing siloxanes of formula (I) and/or formula (II) to alkoxy-functional polysiloxanes of formula (III) is 1:99 to 99:1, preferably 3:97 to 50:50 and more preferably 5:95 to 30:70, based on the overall silicone matrix.

13. Process according to either of embodiments 11-12, characterized in that the catalyst is formed in situ or prior to the reaction, preferably from a Lewis acid such as a titanium alkoxide and an anhydride such as acetic anhydride.

14. Process according to any of embodiments 11-13, characterized in that the end-equilibrated acetoxy group-bearing siloxanes of formula (I) or formula (II) have been neutralized and optionally distilled.

15. Process according to any of embodiments 11-14, characterized in that the acetoxy group-bearing siloxanes have D units.

16. Process according to any of embodiments 11-15, characterized in that α,ω-acetoxy group-bearing linear polydimethylsiloxanes are used.

17. Process according to any of embodiments 11-16, characterized in that alkoxy-functional polysiloxanes having $R^1$ radicals=methyl and/or phenyl radicals are used.

18. Process according to any of embodiments 11-17, characterized in that the alkoxy functionality of the alkoxy-functional polysiloxanes is from 50% to 3% by weight, preferably 40% to 5% by weight and more preferably 30% to 7% by weight, based on the total mass of the resin component.

19. Process according to any of embodiments 11-18, characterized in that the catalyst is selected from tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, dioctyltin dilaurate, dioctyltin dineodecanoate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl) zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates, bismuth triflate.

20. Process according to any of embodiments 11-19, characterized in that at least one crosslinker of formula (IV) is used.

21. Process according to any of embodiments 11-20, characterized in that the crosslinker is selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane and diethoxyphenylmethylsilane.

22. Process according to any of embodiments 11-21, characterized in that the acetic ester formed from the $R^2$ radical and the acetoxy group is removed during the reaction.

23. Process according to embodiment 22, characterized in that the acetic ester formed is removed from the reaction by distillation and/or optionally with application of an auxiliary vacuum.

24. Process according to any of embodiments 11-23, characterized in that the condensation reaction is complete with respect to acetoxysiloxane/silane used.

25. Use of the curable condensation compounds according to any of embodiments 1-10 for production of coatings having anti-adhesive properties, anti-graffiti properties and/or anti-fouling properties.

26. Coated product having a coating comprising a condensation compound according to any of embodiments 1-10.

DETAILED DESCRIPTION OF THE INVENTION

It has been found that the curable condensation compounds according to the invention can be used for production of coating systems having anti-adhesive properties, especially having anti-graffiti effect. Moreover, the coatings produced therefrom surprisingly have better surface slip than customary coatings.

It was found in the tests that the coatings produced with the curable condensation compounds according to the invention prevent or reduce soiling adhesion of any kind and show no impairment of other properties.

The various fragments of the siloxane chains indicated in the formula (I) to formula (III) may be statistically distributed. Statistical distributions may have a blockwise construction with any number of blocks and any sequence or be subject to a randomized distribution; they may also have an alternating construction or else form a gradient along the chain; in particular, they may also form any mixed forms.

The indices recited herein and the value ranges for the indicated indices may be regarded as average values for the possible statistical distribution of the structures actually present and/or mixtures thereof.

In the context of this invention, the word fragment "poly" encompasses not just compounds having at least 3 repeat units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

Unless stated otherwise, percentages are figures in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

Particularly suitable end-equilibrated acetoxy group-bearing siloxanes of formula (I) and/or formula (II) and the preparation thereof are known from the prior art. Accordingly, it is possible, for example, to arrive at a linear or branched polysiloxane bearing terminal acetoxy groups by reacting a linear polysilicone equilibrate (=pre-equilibrate) bearing terminal alkoxy groups as sole reactant with a reaction medium consisting of acetic anhydride, trifluoromethanesulfonic acid and acetic acid.

Numerous synthesis methods are known to the person skilled in the art. Just a few will be named here, which are also intended to be constituent parts of this invention:

It is conceivable to use trifluoromethanesulfonic acid, equilibrated acetoxysiloxanes of the linear or else branched structure type of the formula (I) or formula (II), the preparation of which can be inferred from the teaching of European patent application EP 3611215A1, according to which cyclic siloxanes, especially comprising D4 and/or D5, and/or mixtures of cyclic-branched siloxanes of the D/T type are reacted with acetic anhydride and with addition of acetic acid using trifluoromethanesulfonic acid as catalyst.

European patent applications having application references EP 18189072.4, EP 18189075.7 and EP 18189074.0 are directed to processes for preparing acetoxy-modified siloxanes in which DT siloxane cycles or simple siloxane cycles containing only D units are respectively used as reactants.

In aiming to obtain not branched but linear SiOC-linked silicone polyether structures, European patent applications with application references EP 18189072.4 and EP 18189074.0 state in this regard that equilibrated α,ω-diacetoxypolydimethylsiloxanes are prepared by the reaction of siloxane cycles (D4/D5) with acetic anhydride in the presence of trifluoromethanesulfonic acid by contacting the reactants with 0.1 to 0.3 percent by mass of trifluoromethanesulfonic acid based on the entire reaction mass while mixing the reactants well and then heating to temperatures of 140 to 160° C. for a duration of 4 to 8 hours. In the course of this, the initially slightly cloudy reaction mixture affords a clear, equilibrated trifluoromethanesulfonic acid-catalysed α,ω-diacetoxypolydimethylsiloxane which, as well as trifluoromethanesulfonic acid used, also contains 0.125 mol of free acetic anhydride based on the acetic anhydride equivalent chemically bound within the α,ω-diacetoxypolydimethylsiloxane.

The European patent application with application number EP18210035.4 describes (i) reaction systems for preparation of siloxanes bearing acetoxy functions, comprising a) silanes and/or siloxanes bearing alkoxy groups and/or b) silanes and/or siloxanes bearing acetoxy groups, c) silanes and/or siloxanes bearing hydroxy groups, d) optionally simple siloxane cycles and/or DT cycles, e) a reaction medium, comprising acetic anhydride, perfluoroalkanesulfonic acid and preferably acetic acid, (ii) a process for preparing linear or branched siloxanes bearing acetoxy functions.

The branched siloxanes provided with terminal acetoxy groups that are to be used in accordance with the invention are obtainable, for example, by processes described in patent applications that are yet to be published with application number EP 19176875.3 and EP 19176874.6, and proceed from cyclic-branched siloxanes of the D/T type that are reacted in a first step under acid catalysis with acetic anhydride, optionally in a blend with simple siloxane cycles and/or siloxanes bearing hydroxyl groups and/or silanes bearing acetoxy and/or alkoxy groups and/or siloxanes, to give branched siloxanes bearing acetoxy groups, which are then equilibrated in a second step with acids, preferably superacids, especially with addition of acetic acid, where the cyclic-branched siloxanes of the D/T type are mixtures of cyclic-branched siloxanes of the D/T type which, as well as siloxanes having D and T units, may also include siloxanes having Q units, with the proviso that, in these mixtures, the proportion of silicon atoms coming from Q units accounts for ≤10% by mass to ≤0% by mass, preferably ≤5% by mass to ≤0% by mass, based on the totality of all silicon atoms, where the application document EP 19176875.3 also contains the proviso that, if the cyclic-branched siloxanes of the D/T type used are mixtures of cyclic-branched siloxanes of the D/T type that do not contain siloxanes having Q units, the acid(s) used in step 1 and/or 2 is/are not only trifluoromethanesulfonic acid or not only trifluoromethanesulfonic acid and acetic acid.

Preferably, the end-equilibrated acetoxy group-bearing siloxanes of formula (I) have exclusively D units.

Preference is given to using end-equilibrated α,ω-acetoxy group-bearing linear polydimethylsiloxanes for the reaction.

Preferably, end-equilibrated acetoxy group-bearing siloxanes of formula (I) and/or formula (II) are neutralized.

The neutralization of the acetoxysiloxanes in Brønsted acid solution, especially trifluoromethanesulfonic acid solution, is described in the patent application with application number EP 19176868.8. For this purpose, the acetoxysiloxane to be neutralized is admixed with an amount of a solid and/or liquid and/or gaseous base suitable at least for neutralization of the Brønsted acid, especially trifluoromethanesulfonic acid, present therein, and the neutralized acetoxysiloxane is separated from the salt formed. For assurance of neutralization, preference is given to using the base used for neutralization in a stoichiometric excess based on the acid equivalent to be neutralized.

Acetoxysiloxanes and acetoxy group-bearing siloxanes are used here as synonyms.

Suitable alkoxy-functional polysiloxanes of the formula (III) are frequently also referred to as silicone resins. This formula relates to the smallest unit of the averaged structural formula of the silicone polymer. The number of repeat units can be established from the number-average Mn determined by GPC.

The production of silicone resins of these kinds has long been known in the literature (see for example W. Noll—Chemie und Technologie der Silicone [Chemistry and Technology of the Silicones], Wiley-VCH Verlag GmbH & Co. KGaA, Weinheim, 1960) and is also described in German patent specification DE 34 12 648.

The $R^1$ radicals are preferably independently saturated, branched or unbranched alkyl radicals having 1 to 17 carbon atoms and/or are mono- or polyunsaturated, branched or unbranched alkenyl radicals having 2 to 17 carbon atoms or aromatic groups having 6 to 12 carbon atoms. The alkyl and alkenyl radicals more preferably have up to 12, further preferably up to 8, carbon atoms. It is also more preferable that all $R^1$ radicals are methyl and/or phenyl.

The $R^2$ radicals are preferably independently saturated, branched or unbranched alkyl radicals having 1 to 8 carbon atoms. $R^2$ is preferably selected from methyl or ethyl groups. The latter are particularly suitable for phenylpolysiloxanes or phenylalkylpolysiloxanes designated HAPS-free (hazardous air pollutant substance-free), which do not contain solvents such as toluene, xylene or benzene and which also release no methanol but only ethanol in the catalytic hydrolysis-condensation crosslinking that takes place at room temperature.

Preferred compounds of the general formula (III) have methyl and/or ethyl groups as $R^2$ radical, with an alkoxy functionality of 3% to 50% by weight, preferably 5% to 40% by weight, more preferably 7% to 30% by weight, based on the total mass of the compound.

The weight-average molecular weight $M_w$ of the compound of the general formula (III) is preferably 200 to 20 000 g/mol, more preferably 200 to 10 000 g/mol, further preferably 300 to 3000 g/mol or especially preferably 400 to 2000 g/mol.

For the reaction according to the invention, a major role is played by the alkoxy functionality of the polysiloxanes of the general formula (III).

Alkoxy-functional in the sense of the present invention means that, in the polysiloxane, there are alkyl groups bonded to silicon via oxygen. Preferably, alkoxy-functional means the presence of Si—O—R groups. The alkoxy functionality indicates the proportion by mass of alkoxy groups based on the polysiloxane.

It should be noted here that the use of alkoxy-functional polysiloxanes of the formula (III) is found to be advantageous over the use of the silanols detailed in the prior art. The storage stability of siloxanes bearing ≡SiOH groups is very limited, especially under the influence of traces of acids and bases that are always ubiquitously present. Furthermore, the silanol-functional polysiloxanes that are typically used for coating systems are generally solid and always require a solvent for processing thereof, in order either to further functionalize or else apply them. Once applied to a substrate, polysiloxanes bearing silanol groups are less reactive compared to systems bearing alkoxy groups, and need high temperatures for crosslinking to take place. It is thus not possible to use silanol-functional polysiloxanes on thermally sensitive substrates. Silanol-functional polysiloxanes are therefore unsuitable for exterior applications on non-heatable substrates, for example for an anti-graffiti coating.

Preference is given to the polysiloxanes of the general formula (III) where $R^1$ is methyl, known as methylsilicone resins, having an alkoxy functionality of 7% to 35% by weight based on the total mass of the polysiloxanes and a weight-average molar mass of 300 to 2000 g/mol.

Also preferred are the polysiloxanes of the general formula (III) where $R^1$ is phenyl, called phenyl resins. They preferably have a proportion of alkoxy groups of 1% to 40% by weight based on the polysiloxane, more preferably 3% to 35% by weight and most preferably 5% to 30% by weight.

Further preferably, the weight-average molecular weight Mw of the phenyl resins is 200 to 10 000 g/mol, preferably 200 to 3000 g/mol, more preferably 300 to 2000 g/mol.

The weight-average molecular weight Mw of the phenyl resins is more preferably 700 to 2000 g/mol.

In a further embodiment, preference is given to the polysiloxanes of the general formula (III) where $R^1$ comprises phenyl and methyl groups, called methyl-phenyl resins.

Particularly preferred methyl-phenyl resins have methoxy and/or ethoxy groups as alkoxy groups, the proportion of the alkoxy groups, more particularly of the methoxy and/or ethoxy groups, being at least 1% by weight based on the polysiloxane, preferably 2% to 40% by weight, more preferably 3% to 35% by weight and most preferably 5% to 30% by weight.

The numerical phenyl-to-methyl ratio, based on the number of moles in the resin, is preferably in the range from 1:0.1 to 0.1:1, more preferably in the range from 0.5:1 to 1:0.5.

Where chemical (empirical) formulae are used in the present invention, the specified indices can be not only absolute numbers but also average values.

For polymeric compounds, the indices preferably represent average values.

Unless stated otherwise, percentages are figures in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

The condensation compounds according to the invention are preferably prepared using a catalyst selected from tin diacetate, tin dioctoate, dibutyltin diacetylacetonate, dibutyltin dilaurate, tin tetraacetate, dibutyltin diacetate, dibutyltin dioctoate, dibutyltin dioleate, dioctyltin dilaurate, dioctyltin dineodecanoate, dimethoxydibutyltin, dimethyltin, dibutyltinbenzyl maleate, bis(triethoxysiloxy)dibutytin, diphenyltin diacetate, tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride, cobalt diacetate, bismuth carboxylates and bismuth triflate. Other catalysts that may be used are iron(II) and iron(III) compounds, for example iron(III) acetylacetonate or iron(II) acetate, aluminium compounds, for example aluminium acetylacetonate, calcium compounds, for example calcium ethylenediaminetetraacetate, or magnesium compounds, for example magnesium ethylenediaminetetraacetate.

It is also conceivable to use perfluoroalkanesulfonic acid, for example trifluoromethanesulfonic acid or perfluorobutanesulfonic acid, as catalyst.

Preference is given to using a catalyst according to the invention which is described in detail and elucidated hereinafter.

The reaction preferably includes at least one crosslinker of formula (IV)

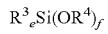  Formula (IV)

in which e is not less than 0 to not more than 2, f is not less than 2 to not more than 4, and the sum total of e+f is 4.

$R^3$=a saturated or unsaturated alkyl group consisting of 1 to 8 carbon atoms, or an organic moiety consisting of 1 to 8 carbon atoms and 1 to 2 nitrogen atoms or an aromatic moiety having 6 to 20 carbon atoms and $R^4$=an alkyl or acyl group consisting of 1 to 8 carbon atoms.

Alkyl groups are preferably methyl, ethyl, propyl, isopropyl, n-butyl, s-butyl and t-butyl groups. The aromatic moiety is preferably a phenyl moiety. Preferred substituents $R^3$ are methyl or phenyl radicals, or mixtures of methyl and phenyl radicals. Preferred alkyl groups for the $R^4$ radical are methyl, ethyl, propyl, isopropyl, n-butyl, s-butyl and tert-butyl groups.

The crosslinker is preferably selected from methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane and diethoxyphenylmethylsilane.

Advantageously, it is therefore possible by the process according to the invention to increase the level of branching of the condensation compounds by adding
a) branched acetoxysiloxane and/or
b) a branching crosslinker to the reaction matrix.

Furthermore, according to the invention, there is a possibility of subsequent crosslinking with an associated increase in molar mass in that the branched condensation compounds are reacted with additional acetoxysiloxanes.

The terms "siloxanes" and "polysiloxanes", whether as part of a word or alone, are understood to be synonyms in the present invention.

The curable condensation compounds according to the invention preferably contain the crosslinker in amounts of 0% to 20% by weight, preferably 0% to 10% by weight and more preferably 0% to 5% by weight, based on the total mass of the curable condensation compounds.

It is additionally also desirable to provide a process by which curable condensation compounds based on alkoxy-functional polysiloxanes can be prepared easily and without the disadvantages known from the prior art.

It has now been found that, surprisingly, it is possible both without the use of organochlorosilanes mentioned at the outset and without the use of alcoholysis/hydrolysis operations that are difficult to control, in a simple and unambiguous manner, to arrive at curable condensation compounds based on alkoxy-functional polysiloxanes that are free of ≡Si—OH groups by reacting end-equilibrated acetoxy group-bearing siloxanes of formula (I) and/or formula (II) with at least one alkoxy-functional polysiloxane of the formula (III) in the presence of a catalyst.

The weight ratio of acetoxy group-bearing siloxanes of formula (I) and/or formula (II) to alkoxy-functional polysiloxanes of formula (III) is preferably 1:99 to 99:1, more preferably 3:97 to 50:50 and especially preferably 5:95 to 30:70, based on the overall silicone matrix.

It is possible to use any customary catalysts. Preferred catalysts have been described above.

In addition, it has been found that, surprisingly, the process according to the invention is most preferably performed in the presence of a silicone matrix-compatible catalyst which is obtained, for example, prior to commencement of the condensation reaction to be catalysed by reacting titanium alkoxides with acetic anhydride or else titanium alkoxides with acetoxysiloxanes.

Reaction matrix and silicone matrix are used here as synonyms, being composed essentially of compounds of the formula (I) or (II) and compounds of the formula (III).

More particularly, the catalyst that results in accordance with the invention from the reaction of titanium alkoxides with acetoxysiloxane can also preferably be prepared in situ.

The preparation of the novel catalyst thus forms a further part of the subject-matter of the invention. The catalyst according to the invention can preferably be prepared from titanium alkoxides with acetic anhydride or from titanium alkoxides with acetoxysiloxanes. More preferably, the catalyst according to the invention can be prepared from titanium alkoxides and acetoxysiloxane in situ, i.e. during the reaction of compounds of the formula (I) or (II) with compounds of the formula (III).

The catalyst resulting from the reaction of titanium alkoxides with acetoxysiloxanes has excellent compatibility with the reaction matrix and permits both the timely rapid reaction of alkoxypolysiloxanes with acetoxysiloxanes and the curing of the curable condensation compounds that result therefrom under the usual atmosphere.

In a preferred configuration variant, it is possible in accordance with the invention first to premix acetoxysiloxane and alkoxy-functional polysiloxane and then to contact them with titanium alkoxide and/or more preferably with the condensation catalyst that resulted from the reaction of acetoxysiloxane with titanium alkoxide.

Alternatively preferably, it is possible in accordance with the invention to prepare the silicone matrix-compatible condensation catalyst by mixing and prior reaction of acetoxysiloxane with titanium alkoxide. Adding the alkoxy-functional polysiloxane then forms the condensable reaction matrix.

In the context of the present invention, the compatibility of the condensation catalyst is determined by the occurrence or lack of occurrence of haze after introduction thereof into the reaction matrix or after formation thereof in situ therein. If a volume aliquot taken from the reaction matrix for this purpose is introduced into a glass cuvette of thickness 10 mm and a text immediately behind it (printed in black in Arial size 12 on white paper) can then be read without distortion in daylight and/or artificial light, the reaction matrix is considered to be free of haze, and the condensation catalyst is considered to be compatible in accordance with the invention.

In a further, preferred configuration of the invention, acetoxysiloxane, alkoxypolysiloxane and titanium alkoxide are reacted with intensive mixing.

According to the invention, all the catalysts mentioned can be used in amounts of 0.01% to 10.0% by weight, preferably of 0.05% to 7.5% by weight, more preferably 0.1% to 5.0% by weight, based on the reaction matrix consisting of alkoxypolysiloxane and acetoxysiloxane.

The alkoxy-functional polysiloxanes of formula (III) and end-equilibrated acetoxy group-bearing siloxanes of formula (I) and/or formula (II), including their preferred embodiments, that are used for the process in accordance with the invention are described in detail above.

According to the invention, the condensation reaction can preferably be completed by removing the acetic ester formed from the $R^2$ radical and the acetoxy group during the reaction. The removal of the acetic ester released from the reaction matrix can be effected under standard pressure or more preferably under reduced pressure, i.e. with application of an auxiliary vacuum. Further options are known to the person skilled in the art.

According to the invention, the condensation reaction of alkoxy-functional polysiloxanes with acetoxysiloxanes can preferably be performed either in neat form, i.e. without use of solvents, but also in solution. Examples of suitable solvents include aromatics, alkylaromatics, but also aliphatic hydrocarbons.

Preference is given to using solvents having a boiling point higher than the boiling point of the acetic ester released from the condensation reaction, formed from the $R^2$ radical and the acetoxy group.

Condensation reaction and reaction are used here as synonyms.

Preference is given to using a crosslinker of the formula (IV). Preferred crosslinker compounds have been described above.

It is conceivable that the crosslinker is used as a mixture consisting of at least two crosslinkers. As an example, it is possible to use a mixture of phenyltrimethoxysilane and methylphenyldimethoxysilane as a monomer blend for the purposes of the present invention.

$^{29}$Si NMR spectroscopy (measured on a Bruker Avance III 400 spectrometer with a Bruker PA BBO 400Si BB-H-D-10 z sample head, at a frequency of 79.495 MHz, a measurement time of 2.569 seconds per scan and at 512 scans per spectrum), supplemented by GPC, can be used to observe the reaction. $^{29}$Si NMR spectroscopy in particular enables monitoring of conversion via the observation of the characteristic signal for the Si-acetoxy moiety.

Taking the disappearance of the $^{29}$Si NMR signal typical of acetoxysiloxanes at −9 ppm as a reliable indicator of complete conversion, for example, the reaction mixtures according to the invention that are detailed in the examples attain quantitative conversion after 1 to 3 hours.

The curable condensation compounds obtained in accordance with the invention have the great advantage that they do not contain any fractions at all of siloxanes bearing ≡Si—OH groups. The shortcomings that emanate especially from the elevated presence of ≡Si—OH groups in alkoxy-functional polysiloxanes have already been sufficiently discussed, for example, in WO 2014/187972, and specifically therein for hyperbranched polyalkoxysiloxane additives with reference to the aspect of their lack of storage stability (page 8), and also in patent specification EP 0771835 B1 with regard to their lack of storage stability (page 4 lines 29-30), and in EP 0964020 B1 with regard to inadequate resistance to speck formation on processing of the alkoxy-functional polysiloxane in a coating composition (page 3, [0026]).

The condensation compounds that are curable in accordance with the invention are preferably clear to slightly cloudy liquids which, with respect to the starting materials used (formula (I), (II) and formula (III)), have a distinct increase in molar mass that can be readily appreciated with the aid of GPC analysis.

It has also been found that the curable condensation compounds according to the invention, on account of catalyst component remaining in the system, have a certain self-curing character ("1K character").

If even faster partial and complete drying times beyond that should be desired, it is advisable to add further curing catalysts. Customary curing catalysts are known to the person skilled in the art. A few are listed here by way of example: 3-aminopropyltriethoxysilane, 3-aminopropyltrimethoxysilane, tetra(i-propyl) titanate, tetra(n-butyl) titanate, 1,1,3,3-tetramethylguanidine, 1,8-diazabicyclo[5.4.0]undec-7-ene, 1,5-diazabicyclo[4.3.0]non-5-ene and dioctyltin dilaurate.

A further aim of the present invention was to provide coating compositions having anti-graffiti effect that do not unfavourably alter the properties of the substrate. For instance, the coatings or paints used for production of graffiti are no longer to adhere, or to adhere only very weakly, on the substrate by virtue of a coating according to the invention having anti-graffiti effect, and sprayed substrates should be easy to clean, such that, for example, water, cloths, surfactants, high-pressure cleaners and mild solvents are adequate. A complex cleaning procedure as known from the prior art is to be avoided as far as possible.

Very surprisingly, it has been found that the coatings according to the invention withstand multiple cleaning cycles without losing their anti-graffiti effect, for example. Thus, the coatings according to the invention are far superior to those from the prior art over their technical lifetime. The user, for example, need not apply a new protective layer after every cleaning process, which means an economic benefit.

Surprisingly, coated products having a coating containing the curable condensation compounds according to the invention have anti-adhesive properties, anti-graffiti properties, anti-friction properties and/or anti-fouling properties.

The use of the curable condensation compounds according to the invention for producing coatings having anti-adhesive properties, anti-graffiti properties, anti-friction properties and/or anti-fouling properties also forms part of the subject-matter of this invention.

Coatings, lacquers, paints, inks, coverings, sealants and adhesives obtainable through use of the curable condensation compounds according to the invention also form a further part of the subject-matter of the invention.

It is known to the person skilled in the art that coatings may also contain adhesion promoters, for example aminosilanes, UV stabilizers, fillers, pigments, thixotropic agents, for example fumed silica, reactive diluents or crosslinkers, for example silanes, solvents, for example xylene, levelling agents, defoamers or accelerators.

The invention is to be elucidated in detail hereinafter by working examples.

Methods

Nuclear Magnetic Resonance (NMR)

NMR spectra are measured with the aid of a Bruker Avance III 400 spectrometer. $^{29}$Si NMR spectra are measured at a frequency of 79.495 MHz using a Bruker PA BBO 400Si BB-H-D-10 z sample head. The measurement time was 2.569 seconds per scan, at 512 scans per spectrum.

Gel Permeation Chromatography (GPC)

Molar masses and molar mass distribution are determined to DIN 55672-1. The method described is not an absolute method. Instead, there is a need for calibration, which is conducted with commercially available polystyrene standards that have a linear structure and are characterized by independent absolute methods. Instrument: Agilent 1100 from Agilent Technologies, column combination: SDV 1000/10000 Å, length 65.00 cm, temperature 30° C., tetrahydrofuran as mobile phase, flow rate 1 ml/min, sample concentration 10 g/l. RI detector, evaluation against a polystyrene standard in the molar mass ratio of 162-2 520 000 g·mol$^{-1}$.

Anti-Graffiti Effect a) Anti-graffiti effect is determined in accordance with ASTM D7089-06. The condensation compounds according to the invention were applied to aluminium Q-Panels with a 100 μm spiral applicator. The coated panels were dried for 24 hours.

Then half of each panel was painted, using a spray nozzle, with a commercial blue-pigmented nitrocellulose lacquer (FLT Handel & Service GmbH) and dried for 24 h. Subsequently, the coated panels with the blue lacquer paint were subjected to a jet of water at a pressure of 5 bar until the blue lacquer can be completely removed. This typically takes not more than 5 minutes. Small residues of paint at the edges of the panels are neglected here.

What is being examined here is whether the coating shows anti-graffiti effect or not.

b) The panels that withstood this first cycle were dried again and painted once again with the spray nozzle and dried. The test was repeated correspondingly with the jet of water until the blue lacquer layer can no longer be removed.

The number of cycles indicates how often a coating has withstood the cleaning procedure before it no longer has any anti-graffiti effect.

The more cleaning cycles a coating has, the greater its economic viability.

Slip Resistance Value G (cN)

A useful method of measuring slip resistance has been found to be a test method in which the friction force is measured. The method is carried out by means of a Bluehill instrument from Instron.

A 500 g weight with defined felt underlay is pulled here uniformly across the coating surface by a tensile tester. The force required for this purpose is measured with an electronic force transducer. The test is carried out at a constant speed of 12 mm/sec and enables a reproducible measurement with high accuracy. For the test, a coating composition according to the invention containing condensation compounds according to the invention was applied to aluminium Q-Panels with the aid of a 100 μm spiral applicator and dried for 24 h.

The lower the slip resistance value G (cN), the higher the surface slip of the coating surface.

Compatibility of the Catalyst According to the Invention

According to the invention, the compatibility of the condensation catalyst is determined by the occurrence or lack of occurrence of haze after introduction thereof or after formation thereof in situ in the reaction matrix.

If an aliquot taken from the reaction matrix for this purpose is introduced into a glass cuvette of thickness 10 mm and a text immediately behind it (font: Arial, font weight: standard, font colour: black on white paper) can then be read without distortion in daylight and/or artificial light, the reaction matrix is considered to be free of haze, and the catalyst is considered to be compatible in accordance with the invention.

Further Conditions

Where in the context of the present invention values are reported in %, these are % by weight values unless otherwise stated. In the case of compositions, percentages, unless defined differently, are based on the overall composition. Where averages are stated in the examples that follow, these are numerical averages unless stated otherwise. Where reference is made hereinafter to measured values, these measured values are determined at a pressure of 101 325 Pa, a temperature of 23° C. and ambient relative humidity of approx. 40% unless stated otherwise.

Materials and Equipment

Decamethylcyclopentasiloxane, from Dow
Acetic anhydride, from Merck
Acetic acid, 100%, from J. T. Baker
Trifluoromethanesulfonic acid, from Alfa Aesar
Potassium acetate, from Sigma-Aldrich
Polydimethylsiloxanediol, from Wacker
Tetra-n-butyl titanate, from ABCR
Tetraisopropyl titanate, from ABCR
Toluene, from Reininghaus Chemie
Silikophen AC1000 (poly(methyltrimethoxysilane)), from Evonik Industries
V5000 (poly(phenyltriethoxysilane)), from Evonik Industries
Dowsil 3074 Intermediate, (methoxy-functional phenyl (methyl)silicone resin), from Dow
Dynasylan AMEO (3-aminopropyltriethoxysilane), from Evonik Industries
Rotavapor R-300 rotary evaporator, from Büchi
Rotavapor B-300 Base oil bath, from Büchi
Standard glass strips, from Gläserei Glänzer
BK3 drying recorder, from The Mickle Laboratory Engineering
Aluminium Q-Panels, 6"×3", from Q-Lab
Coloured spray lacquer, silky matt blue, FLT Handel & Service GmbH

EXAMPLES

1. Preparation of the Curable Condensation Compounds According to the Invention 1.1 Preparation of End-Equilibrated Acetoxy Group-Bearing Siloxanes First of all, end-equilibrated α,ω-diacetoxypolydimethylsiloxanes, referred to hereinafter as α,ω-diacetoxysiloxanes for better readability, are prepared. These are prepared here by the reaction of siloxane cycles ($D_4$ and/or $D_5$) with acetic anhydride in the presence of trifluoromethanesulfonic acid and acetic acid, as disclosed by the teachings of European applications with references EP18172882.5 and EP18172876.7. Following the teachings of these documents, three α,ω-diacetoxysiloxanes A. B and C with average siloxane chain lengths of about 10, 15 and 35 monomer units are thus prepared. The acids present in the α,ω-diacetoxysiloxanes are subsequently neutralized with potassium acetate, and the precipitated salts are filtered off. For removal of volatile constituents, the α,ω-diacetoxysiloxane is distilled at 130° C. and with application of an auxiliary vacuum of 5 mbar for one hour.

TABLE 1

| α,ω-Diacetoxypolydimethylsiloxanes | Average siloxane chain length |
|---|---|
| α,ω-Diacetoxysiloxane A | 10 |
| α,ω-Diacetoxysiloxane B | 15 |
| α,ω-Diacetoxysiloxane C | 35 |

1.2 Alkoxy-Functional Polysiloxanes

The alkoxypolysiloxanes listed in Table 2 are used.

TABLE 2

| Alkoxypolysiloxane | Manufacturer |
|---|---|
| Silikophen AC1000 (poly-(methyltrimethoxysilane)) | from Evonik Industries |
| V5000 (poly(phenyltriethoxysilane)) | from Evonik Industries |
| Dowsil 3074 Intermediate, (methoxy-functional phenyl(methyl)silicone resin) | from Dow |

Example 1 (Inventive)

On a rotary evaporator with heating bath (Rotavapor R-300), a 500 ml one-neck round-bottom flask is initially charged with 100.0 g of Silikophen AC1000, 10.0 g of α,ω-diacetoxysiloxane B and 0.5 g of tetraisopropyl titanate, which are then first mixed at heating bath temperature 130° C. at 100 rpm and ambient pressure for one hour. An auxiliary vacuum of 600 mbar is first applied for a duration of 2 hours, and then an auxiliary vacuum of 100 mbar for a duration of a further 2 hours. The methyl acetate formed in the reaction is collected in a collecting flask. A $^{29}$Si NMR spectrum of the end product remaining in the original flask demonstrates, by virtue of the disappearance of the signal at −9 ppm, that the terminal acetoxy groups of the α,ω-diacetoxysiloxane B have been fully converted. A GPC of the clear colourless product shows a number-average molecular weight $M_n$ of 894 g/mol and a weight-average molecular weight $M_w$, of 4627 g/mol, and thus demonstrates a clear increase in molecular weight compared to the Silikophen AC1000 starting material ($M_n$ 586 and $M_w$ 859 g/mol).

Example 2 (Inventive)

In analogy to Example 1, 400.0 g of Silikophen AC1000, 80.0 g of α,ω-diacetoxysiloxane B and 2.5 g of tetra-n-butyl titanate are weighed out in a 2000 ml one-neck round-bottom flask and reacted on the rotary evaporator. A $^{29}$Si NMR spectrum of the end product shows, by virtue of the disappearance of the signal at −9 ppm, that the terminal acetoxy groups originating from α,ω-diacetoxysiloxane B have been fully converted. A GPC indicates a number-average molecular weight $M_n$ of 884 g/mol and a weight-average molecular weight $M_w$ of 7767 g/mol, and thus demonstrates a clear increase in molecular weight compared to the Silikophen AC1000 starting material ($M_n$ 586 and $M_w$ 859 g/mol).

Example 3 (Inventive)

100.0 g of Dowsil 3074 Intermediate, 7.5 g of α,ω-diacetoxysiloxane A and 0.4 g of tetraisopropyl titanate are weighed out in a 500 ml one-neck round-bottom flask. The conversion of this reaction mixture is conducted analogously to Example 1. What is obtained is a virtually colourless, slightly cloudy liquid. As a result of superposition of signals in the $^{29}$Si NMR-relevant shift region, it is impossible to show the conversion of the terminal acetoxy groups of the α,ω-diacetoxysiloxane A by this method. However, a GPC run shows a number-average molecular weight $M_n$ of 1492 g/mol and a weight-average molecular weight $M_w$ of 2681 g/mol, and thus demonstrates a clear increase in molecular weight compared to the Dowsil 3074 Intermediate starting material (with $M_n$=899 g/mol and $M_w$=1345 g/mol).

Example 4 (Inventive)

100.0 g of Dowsil 3074 Intermediate, 10.0 g of α,ω-diacetoxysiloxane B and 0.4 g of tetraisopropyl titanate are weighed out in a 500 ml one-neck round-bottom flask. The conversion of this reaction mixture is conducted analogously to Example 1. What is isolated is a virtually colourless, slightly cloudy liquid. As a result of superposition of signals in the $^{29}$Si NMR-relevant shift region, it is impossible to show the conversion of the terminal acetoxy groups of the α,ω-diacetoxysiloxane B by this method. But a GPC run shows a number-average molecular weight $M_n$ of 1449 g/mol and a weight-average molecular weight $M_w$ of 2801 g/mol, and thus proves a clear increase in molecular weight compared to the Dowsil 3074 Intermediate starting material (with $M_n$=899 g/mol and $M_w$=1345 g/mol).

Example 5 (Inventive)

100.0 g of V5000, 10.0 g of α,ω-diacetoxysiloxane B and 0.5 g of tetraisopropyl titanate are weighed out in a 500 ml one-neck round-bottom flask. The conversion of this reaction mixture is conducted analogously to Example 1. What is isolated is a pale yellowish liquid with minimal haze. A $^{29}$Si NMR spectrum of the end product shows, by virtue of the disappearance of the signal at −9 ppm that is characteristic of terminal acetoxy groups, the complete conversion of α,ω-diacetoxysiloxane B. A supplementary GPC of the end product shows a number-average molecular weight $M_n$ of 1070 g/mol and a weight-average molecular weight $M_w$ of 1457 g/mol, and thus a clear increase in molecular weight compared to the V5000 starting material used (with $M_n$=806 g/mol and $M_w$=976 g/mol).

2. Preparation of a Catalyst Solution According to the Invention and Use Thereof for Preparation of the Curable Condensation Compounds According to the Invention

Example 6 (Inventive)

A catalyst solution consisting of 1.00 g of tetraisopropyl titanate, 0.37 g of acetic anhydride and 2.00 g of toluene was prepared. After the exothermicity has abated, the clear catalyst solution thus obtained is usable directly.

In analogy to Example 1, 100.0 g of Silikophen AC1000, 10.0 g of α,ω-diacetoxysiloxane C and 1.0 g of catalyst solution are weighed out in a 500 ml one-neck round-bottom flask. An aliquot taken from the homogeneous reaction matrix was introduced into a glass cuvette of thickness 10 mm and it was possible to read a text immediately behind it (font: Arial, font weight: standard, font colour: black on white paper) without distortion in artificial light, and so the reaction matrix was considered to be free of haze and the catalyst to be compatible in accordance with the invention. After the sample volume has been reintroduced into the reaction mixture, it is heated to 130° C. on a rotary evaporator and reacted. A $^{29}$Si NMR spectrum of the end product shows, by virtue of the disappearance of the signal at −9 ppm, that the terminal acetoxy groups originating from α,ω-diacetoxysiloxane C have been fully converted. A GPC indicates a number-average molecular weight $M_n$ of 831 g/mol and a weight-average molecular weight $M_w$ of 2893 g/mol, and thus demonstrates a clear increase in molecular weight compared to the Silikophen AC1000 starting material ($M_n$ 586 and $M_w$ 859 g/mol).

Example 7 (Inventive)

A 250 ml multineck flask was initially charged with 6.0 g (0.0211 mol) of Ti(IV) isopropoxide at 23° C. in 50 g of toluene while stirring, and then a solution consisting of 94.0 g of α,ω-diacetoxysiloxane B and 50 g of toluene was metered in by means of a dropping funnel within 10 minutes. The clear reaction mixture was then heated to 80° C. for one hour and subsequently freed of volatiles at 70° C. and an auxiliary vacuum of <5 mbar on a rotary evaporator. The liquid residue is pale yellowish and clear.

A 250 ml four-neck flask was charged at 23° C. with 50 g of Silikophen AC1000 (poly(methyltrimethoxysilane)) while stirring, and then 5 g of an end-equilibrated α,ω- diacetoxysiloxane B (neutralized with potassium acetate, filtered, distilled at 130° C. and an applied auxiliary vacuum of <5 mbar, freed of volatiles, chain length N=13.6, MW=1112.9 g/mol, determined by $^{29}$Si NMR spectrum) was added. 4.6 g of the titanium catalyst prepared was added while stirring. An aliquot taken from the homogeneous reaction matrix was introduced into a glass cuvette of thickness 10 mm and it was possible to read a text immediately behind it (font: Arial, font weight: standard, font colour: black on white paper) without distortion in artificial light, and so the reaction matrix was considered to be free of haze and the catalyst to be compatible in accordance with the invention. After the sample volume has been reintroduced into the reaction mixture, it is heated to 130° C. After a reaction time of 1 hour, volatile constituents were removed for a further 4 hours by applying an auxiliary vacuum in the pressure range between 600 mbar and 100 mbar.

The residue isolated after cooling is a clear, pale yellowish product, the corresponding $^{29}$Si NMR spectrum of which shows the complete conversion of the acetoxysiloxane used.

2. Performance Testing 2.1 Anti-Graffiti Effect

The panels coated with the curable condensation compounds according to the invention (Examples 1 to 6) and cured were used to determine anti-graffiti properties. Examples 1, 2 and 6 cured without the addition of curing catalysts. In Examples 3, 4 and 5, 5.0% by weight of Dynasylan AMEO based on the total mass of the resin was added as curing catalyst; see Table 3.

As Comparative Example CE1, Silikophen AC1000 was applied to the panels and cured with 1.5% by weight of tetra-n-butyl titanate (TnBT) based on the total amount of the resin. As Comparative Example CE2, Dowsil 3074 Intermediate was applied to the panels and cured with 5.0% by weight of Dynasylan AMEO based on the total amount of the resin.

The results are listed in Table 3. It is found that comparative examples CE1 and CE2 did not show any anti-graffiti effect since the lacquer layer sprayed on was not removable. The coatings according to the invention with the curable condensation compounds 1-6 had anti-graffiti effect. Some coatings according to the invention even withstood up to five cleaning cycles.

TABLE 3

Anti-graffiti effect

| Example | Catalyst | % by weight | Anti-graffiti effect | Cycles |
|---|---|---|---|---|
| 1 |  |  | yes | 2 |
| 2 |  |  | yes | 2 |
| 3 | AMEO | 5.0 | yes | 5 |
| 4 | AMEO | 5.0 | yes | 3 |
| 5 | AMEO | 5.0 | yes | 1 |
| 6 | — |  | yes | 2 |
| CE1 | TnBT | 1.5 | no | 0 |
| CE2 | AMEO | 5.0 | no | 0 |

2.3 Surface Slip

As Comparative Example CE3, Silikophen AC1000 was applied to the panel and cured with the aid of 1.5% by weight of tetra-n-butyl titanate based on the total amount of the resin. The results are collated in Table 4. It is found that the coatings according to the invention of Examples 1 and 6 have a considerable reduction in slip value compared to the comparative example (CE3). The surface slip of the coatings according to the invention is therefore better than that of the comparative example.

TABLE 4

Slip values

| Example | Slip value/cN |
|---|---|
| 1 | 129 |
| 6 | 66 |
| CE3 | 229 |

The invention claimed is:

1. A curable condensation compound, obtained by a reaction of end-equilibrated acetoxy group-bearing siloxanes of formula (I) and/or formula (II)
with at least one alkoxy-functional polysiloxane of formula (III):

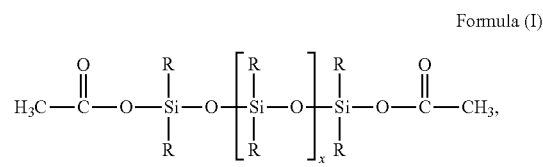

Formula (I)

wherein R=an alkyl radical having 1 to 4 carbon atoms and/or phenyl radical,
and $1 \leq x \leq 500$;
and/or

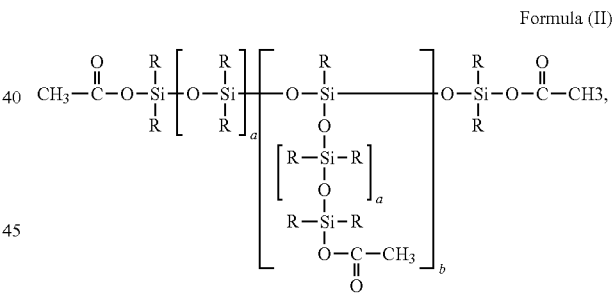

Formula (II)

wherein R=an alkyl radical having 1 to 4 carbon atoms and/or phenyl radical,
and $0 \leq a \leq 100$ and $1 \leq b \leq 10$;
with

Formula (III)

$R^1{}_c Si(OR^2)_d O_{(4-c-d)/2}$ wherein c is not less than 0 to not more than 2, d is not less than 0 to not more than 4, and a sum total of c+d is less than 4,
$R^1$ is the same or different and is independently linear or branched, saturated or else mono- or polyunsaturated or aromatic hydrocarbon radicals, and
$R^2$ is an alkyl group comprising 1 to 8 carbon atoms; and
in the presence of a catalyst, wherein the end-equilibrated acetoxy group-bearing siloxanes of formula (I) and/or formula (II) have been neutralized,
said curable condensation compound is a liquid at ambient temperature, and said catalyst is a titanium alkoxide catalyst.

2. The condensation compound according to claim 1, wherein the reaction includes at least one crosslinker of formula (IV):

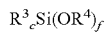 Formula (IV)

wherein e is not less than 0 to not more than 2, f is not less than 2 to not more than 4, and a sum total of e+f is 4,
$R^3$=a saturated or unsaturated alkyl group comprising 1 to 8 carbon atoms or an aromatic moiety having 6 to 20 carbon atoms, and
$R^4$=an alkyl or acyl group comprising 1 to 8 carbon atoms.

3. The condensation compound according to claim 1, wherein the end-equilibrated acetoxy group-bearing siloxanes of formula (I) and/or formula (II) are α,ω-acetoxy group-bearing linear polydimethylsiloxanes.

4. The condensation compound according to claim 1, wherein in the at least one alkoxy-functional polysiloxane of formula (III), $R^1$=a methyl radical and/or a phenyl radical.

5. The condensation compound according to claim 1, wherein a weight-average molecular weight of the at least one alkoxy-functional polysiloxane of formula (III) is 200 to 20,000 g/mol.

6. The condensation compound according to claim 1, having 3 to 50% by weight of methyl and/or ethyl groups as $R^2$ radicals based on a total mass of compound of general formula (III).

7. The condensation compound according to claim 1, wherein the catalyst is at least one selected from the group consisting of tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato) titanium, dibutoxybis(acetylacetonato)titanium, triisopropoxyallyltitanium acetate, and isopropoxyoctylene glycol-titanium oxide.

8. The condensation compound according to claim 2, wherein the at least one crosslinker of formula (IV) is selected from the group consisting of methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane, and diethoxyphenylmethylsilane.

9. A process for preparing the condensation compound according to claim 1, the process comprising:
reacting the end-equilibrated acetoxy group-bearing siloxanes of formula (I) and/or formula (II) with the at least one alkoxy-functional polysiloxane of formula (III), in the presence of the catalyst which is a titanium alkoxide catalyst.

10. The process according to claim 9, wherein a weight ratio of the end-equilibrated acetoxy group-bearing siloxanes of formula (I) and/or formula (II) to the at least one alkoxy-functional polysiloxane of formula (III) is 1:99 to 99:1.

11. The process according to claim 9, wherein the end-equilibrated acetoxy group-bearing siloxanes of formula (I) and/or formula (II) have been neutralized and optionally distilled.

12. The process according to claim 9, wherein the end-equilibrated acetoxy group-bearing siloxanes of formula (I) and/or formula (II) are α,ω-acetoxy group-bearing linear polydimethylsiloxanes.

13. The process according to claim 9, wherein in the at least one alkoxy-functional polysiloxane of formula (III), $R^1$=a methyl radical and/or a phenyl radical.

14. The process according to claim 9, having 3 to 50% by weight of methyl and/or ethyl groups as $R^2$ radicals based on a total mass of compound of general formula (III).

15. The process according to claim 9, wherein the catalyst is at least one selected from the group consisting of tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato) titanium, diisopropoxybis(acetylacetonato)titanium, dibutoxybis(acetylacetonato)titanium, triisopropoxyallyltitanium acetate, and isopropoxyoctylene glycol-titanium oxide.

16. The process according to claim 9, wherein at least one crosslinker of formula (IV) is used in the reaction:

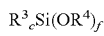 Formula (IV)

wherein e is not less than 0 to not more than 2, f is not less than 2 to not more than 4, and a sum total of e+f is 4,
$R^3$=a saturated or unsaturated alkyl group comprising 1 to 8 carbon atoms or an aromatic moiety having 6 to 20 carbon atoms, and
$R^4$=an alkyl or acyl group comprising 1 to 8 carbon atoms.

17. The process according to claim 16, wherein the at least one crosslinker of formula (IV) is selected from the group consisting of methyltriacetoxysilane, ethyltriacetoxysilane, dimethyldiacetoxysilane, methyltrimethoxysilane, methyltriethoxysilane, vinyltrimethoxysilane, vinyltriethoxysilane, tetramethoxysilane, tetraethoxysilane, phenyltriethoxysilane, phenyltrimethoxysilane, propyltrimethoxysilane, propyltriethoxysilane, dimethyldimethoxysilane, dimethyldiethoxysilane, dimethoxyphenylmethylsilane, and diethoxyphenylmethylsilane.

18. The process according to claim 9, wherein an acetic ester, formed from the $R^2$ radical and the acetoxy group, is removed during the reaction.

19. The process according to claim 18, wherein the acetic ester formed is removed from the reaction by distillation and/or optionally, with application of an auxiliary vacuum.

20. The process according to claim 9, wherein acetoxysiloxanes are reacted to completion.

21. A method of producing a coating, comprising:
mixing the condensation compound according to claim 1 into a coating, to obtain a coating having an anti-adhesive property, an anti-graffiti property, and/or an anti-fouling property.

22. A coated product, having a coating comprising the condensation compound according to claim 1.

23. The condensation compound according to claim 1, wherein
said end-equilibrated acetoxy group-bearing siloxane of formula (I) and/or formula (II) is an α,ω-Diacetoxysiloxane having an average siloxane chain length of 15;
said at least one alkoxy-functional polysiloxane of formula (III) is a poly(methyltrimethoxysilane); and
said catalyst is tetraisopropyl titanate.

24. The condensation compound according to claim 1, wherein
said end-equilibrated acetoxy group-bearing siloxane of formula (I) and/or formula (II) is an α,ω-Diacetoxysiloxane having an average siloxane chain length of 10;

said at least one alkoxy-functional polysiloxane of formula (III) is a methoxy-functional phenyl(methyl)silicone resin; and said catalyst is tetraisopropyl titanate.

25. The curable condensation compound according to claim 1, wherein said the end-equilibrated acetoxy group-bearing siloxanes of formula (I) and/or formula (II) which has been neutralized, is the result of neutralization of a trifluoromethanesulfonic acid.

26. A coating method comprising applying the curable condensation compound according to claim 1 in the absence of a solvent, to a surface.

* * * * *